United States Patent
Lee et al.

(10) Patent No.: US 8,380,517 B2
(45) Date of Patent: Feb. 19, 2013

(54) MULTI-LAYERED SPEECH RECOGNITION APPARATUS AND METHOD

(75) Inventors: Jaewon Lee, Seoul (KR); Jeongmi Cho, Suwon-si (KR); Kwangil Hwang, Suwon-si (KR); Yongbeom Lee, Seoul (KR); Jeongsu Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/478,656

(22) Filed: May 23, 2012

(65) Prior Publication Data

US 2012/0232893 A1 Sep. 13, 2012

Related U.S. Application Data

(63) Continuation of application No. 11/120,983, filed on May 4, 2005.

(30) Foreign Application Priority Data

Oct. 8, 2004 (KR) .................. 10-2004-0080352

(51) Int. Cl.
*G10L 21/00* (2006.01)

(52) U.S. Cl. ............ 704/270.1; 704/277; 704/270; 704/257; 704/246; 704/235; 704/231; 704/219; 704/2; 700/94; 455/444; 455/422.1; 382/239; 382/166; 375/340; 375/295; 370/204

(58) Field of Classification Search .......... 704/277, 704/270.1, 270, 257, 246, 235, 219, 2; 700/94; 455/444, 422.1; 382/239, 166; 375/340, 375/295; 370/204
See application file for complete search history.

(56) References Cited

U.S. PATENT DOCUMENTS

| | | | |
|---|---|---|---|
| 5,199,080 A | | 3/1993 | Kimura et al. |
| 5,224,167 A | * | 6/1993 | Taniguchi et al. ............ 704/219 |
| 5,819,220 A | | 10/1998 | Sarukkai et al. |
| 5,825,830 A | * | 10/1998 | Kopf .............................. 375/340 |
| 5,960,399 A | * | 9/1999 | Barclay et al. ............. 704/270.1 |
| 6,327,568 B1 | * | 12/2001 | Joost ........................... 704/270.1 |
| 6,397,186 B1 | | 5/2002 | Bush et al. |
| 6,487,534 B1 | * | 11/2002 | Thelen et al. ................. 704/270 |

(Continued)

FOREIGN PATENT DOCUMENTS

| | | |
|---|---|---|
| EP | 1411497 | 4/2004 |
| JP | 2001-034292 | 2/2001 |

(Continued)

OTHER PUBLICATIONS

Japanese Office Action issued Jan. 24, 2012 in corresponding Japanese Patent Application 2005-294761.

(Continued)

*Primary Examiner* — Michael Colucci
(74) *Attorney, Agent, or Firm* — Staas & Halsey LLP

(57) ABSTRACT

A multi-layered speech recognition apparatus and method, the apparatus includes a client checking whether the client recognizes the speech using a characteristic of speech to be recognized and recognizing the speech or transmitting the characteristic of the speech according to a checked result; and first through N-th servers, wherein the first server checks whether the first server recognizes the speech using the characteristic of the speech transmitted from the client, and recognizes the speech or transmits the characteristic according to a checked result, and wherein an n-th ($2 \leq n \leq N$) server checks whether the n-th server recognizes the speech using the characteristic of the speech transmitted from an (n−1)-th server, and recognizes the speech or transmits the characteristic according to a checked result.

2 Claims, 16 Drawing Sheets

U.S. PATENT DOCUMENTS

| | | | |
|---|---|---|---|
| 6,513,006 B2 | 1/2003 | Howard et al. | |
| 6,556,970 B1 | 4/2003 | Sasaki et al. | |
| 6,594,630 B1 | 7/2003 | Zlokarnik et al. | |
| 6,606,280 B1 | 8/2003 | Knittel | |
| 6,615,171 B1 * | 9/2003 | Kanevsky et al. | 704/246 |
| 6,615,172 B1 * | 9/2003 | Bennett et al. | 704/257 |
| 6,633,846 B1 * | 10/2003 | Bennett et al. | 704/257 |
| 6,633,848 B1 * | 10/2003 | Johnson et al. | 704/277 |
| 6,650,773 B1 * | 11/2003 | Maurer et al. | 382/166 |
| 6,804,647 B1 * | 10/2004 | Heck et al. | 704/246 |
| 6,898,567 B2 * | 5/2005 | Balasuriya | 704/231 |
| 7,085,560 B2 * | 8/2006 | Petermann | 455/422.1 |
| 7,120,585 B2 * | 10/2006 | Boulanov | 704/270.1 |
| 7,184,957 B2 * | 2/2007 | Brookes et al. | 704/246 |
| 7,200,209 B1 | 4/2007 | Kim | |
| 7,343,288 B2 * | 3/2008 | Geppert et al. | 704/235 |
| 7,366,673 B2 * | 4/2008 | Ruback et al. | 704/277 |
| 7,406,413 B2 * | 7/2008 | Geppert et al. | 704/235 |
| 2001/0010711 A1 * | 8/2001 | Dijkmans | 375/295 |
| 2001/0031092 A1 * | 10/2001 | Zeck et al. | 382/239 |
| 2001/0041982 A1 | 11/2001 | Kawasaki et al. | |
| 2002/0010579 A1 | 1/2002 | Kitaoka et al. | |
| 2002/0045961 A1 * | 4/2002 | Gibbs et al. | 700/94 |
| 2002/0046023 A1 * | 4/2002 | Fujii et al. | 704/231 |
| 2002/0059068 A1 * | 5/2002 | Rose et al. | 704/246 |
| 2002/0091528 A1 * | 7/2002 | Daragosh et al. | 704/270.1 |
| 2002/0137517 A1 * | 9/2002 | Williams et al. | 455/444 |
| 2003/0105623 A1 | 6/2003 | Cyr et al. | |
| 2003/0163308 A1 | 8/2003 | Matsuo | |
| 2004/0148164 A1 * | 7/2004 | Baker | 704/231 |
| 2005/0010422 A1 * | 1/2005 | Ikeda et al. | 704/277 |
| 2005/0259566 A1 * | 11/2005 | Chung et al. | 370/204 |
| 2006/0009980 A1 * | 1/2006 | Burke et al. | 704/270 |
| 2006/0080079 A1 * | 4/2006 | Yamabana | 704/2 |

FOREIGN PATENT DOCUMENTS

| | | |
|---|---|---|
| JP | 2001-142488 | 5/2001 |
| JP | 2002-41085 | 2/2002 |
| JP | 2002-049390 | 2/2002 |
| JP | 2003-255982 | 9/2003 |
| JP | 2004-184858 | 7/2004 |
| KR | 2001-0042377 | 5/2001 |
| KR | 2001-0108402 | 12/2001 |
| WO | 99/50830 | 10/1999 |
| WO | 00/58946 | 10/2000 |

OTHER PUBLICATIONS

Office Action issued in Korean Patent Application No. 200480352 on Mar. 31, 2006.

Japanese Office Action for corresponding Japanese Patent Application No. 2005-294761 dated Jun. 28, 2011.

Asami, Katushi, Topic estimation in units of generating language as speech for processing speech dialogue, Information Processing Academy Research Report, vol. 2002, No. 65, Incorporated Association Information Processing Academy, JP2005-294761, Jul. 2002, vol. 2002, p. 45-52.

European Search Report issued Jan. 4, 2006 re: European Application No. 05252392.

Interview Summary mailed May 21, 2012 in related U.S. Appl. No. 11/120,983.

U.S. Office Action mailed Feb. 21, 2012 in related U.S. Appl. No. 11/120,983.

U.S. Advisory Action mailed Feb. 1, 2012 in related U.S. Appl. No. 11/120,983.

U.S. Office Action mailed Feb. 24, 2009 in related U.S. Appl. No. 11/120,983.

U.S. Office Action mailed Nov. 25, 2008 in related U.S. Appl. No. 11/120,983.

U.S. Office Action mailed May 14, 2008 in related U.S. Appl. No. 11/120,983.

U.S. Office Action mailed Feb. 4, 2008 in related U.S. Appl. No. 11/120,983.

U.S. Appl. No. 11/120,983, filed May 4, 2005, Jaewon Lee et al., Samsung Electronics Co., Ltd.

Notice of Allowance mailed Jun. 22, 2012 in related U.S. Appl. No. 11/120,983.

U.S. Notice of Allowance issued Oct. 3, 2012 in related U.S. Appl. No. 11/120,983.

\* cited by examiner

US 8,380,517 B2

MULTI-LAYERED SPEECH RECOGNITION APPARATUS AND METHOD

CROSS-REFERENCE TO RELATED APPLICATION

This application is a continuation of U.S. application Ser. No. 11/120,983, filed May 4, 2005, which claims the benefit of Korean Patent Application No. 2004-80352, filed on Oct. 8, 2004 in the Korean Intellectual Property Office, the disclosures of which are herein incorporated by reference.

BACKGROUND OF THE INVENTION

1. Field of the Invention

The present invention relates to speech recognition, and more particularly, to a speech recognition apparatus and method using a terminal and at least one server.

2. Description of the Related Art

A conventional speech recognition method by which speech recognition is performed only at a terminal is disclosed in U.S. Pat. No. 6,594,630. In the disclosed conventional method, all procedures of speech recognition are performed only at a terminal. Thus, in the conventional method, due to limitation of resources of the terminal, speech cannot be recognized with high quality.

A conventional speech recognition method by which speech is recognized using only a server when a terminal and the server are connected to each other, is disclosed in U.S. Pat. No. 5,819,220. In the disclosed conventional method, the terminal simply receives the speech and transmits the received speech to the server, and the server recognizes the speech transmitted from the terminal. In the conventional method, since all speech input is directed to the server, the load on the server gets very high, and since the speech should be transmitted to the server so that the server can recognize the speech, the speed of speech recognition is reduced.

A conventional speech recognition method, by which speech recognition is performed by both a terminal and a server, is disclosed in U.S. Pat. No. 6,487,534. In the disclosed conventional method, since an Internet search domain is targeted, an applied range thereof is narrow, and the speech recognition method cannot be embodied.

SUMMARY OF THE INVENTION

According to an aspect of the present invention, there is provided a multi-layered speech recognition apparatus to recognize speech in a multi-layered manner using a client and at least one server, which are connected to each other in a multi-layered manner via a network.

According to another aspect of the present invention, there is also provided a multi-layered speech recognition method by which speech is recognized in a multi-layered manner using a client and at least one server, which are connected to each other in a multi-layered manner via a network.

According to an aspect of the present invention, there is provided a multi-layered speech recognition apparatus, the apparatus including a client extracting a characteristic of speech to be recognized, checking whether the client recognizes the speech using the extracted characteristic of the speech and recognizing the speech or transmitting the characteristic of the speech, according to a checked result; and first through N-th (where N is a positive integer equal to or greater than 1) servers, wherein the first server receives the characteristic of the speech transmitted from the client, checks whether the first server recognizes the speech, using the received characteristic of the speech, and recognizes the speech or transmits the characteristic according to a checked result, and wherein the n-th ($2 \leq n \leq N$) server receives the characteristic of the speech transmitted from an (n−1)-th server, checks whether the n-th server recognizes the speech, using the received characteristic of the speech, and recognizes the speech or transmits the characteristic according to a checked result.

According to another aspect of the present invention, there is provided a multi-layered speech recognition method performed in a multi-layered speech recognition apparatus having a client and first through N-th (where N is a positive integer equal to or greater than 1) servers, the method including extracting a characteristic of speech to be recognized, checking whether the client recognizes the speech using the extracted characteristic of the speech, and recognizing the speech or transmitting the characteristic of the speech according to a checked result; and receiving the characteristic of the speech transmitted from the client, checking whether the first server recognizes the speech, using the received characteristic of the speech, and recognizing the speech or transmitting the characteristic according to a checked result, and receiving the characteristic of the speech transmitted from a (n−1)-th ($2 \leq n \leq N$) server, checking whether the n-th server recognizes the speech, using the received characteristic of the speech, and recognizing the speech or transmitting the characteristic according to a checked result, wherein the extracting of the characteristic of the speech to be recognized is performed by the client, the receiving of the characteristic of the speech transmitted from the client is performed by the first server, and the receiving of the characteristic of the speech transmitted from a (n−1)-th server is performed by the n-th server.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
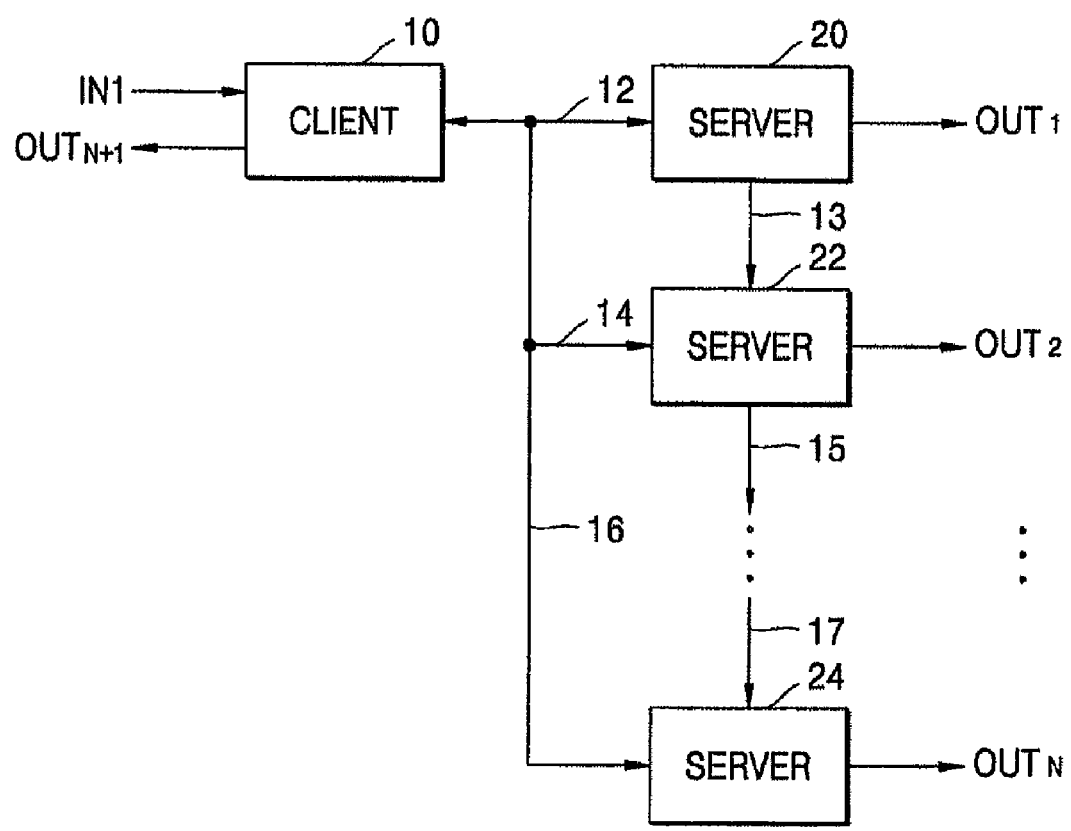
FIG. 1 is a schematic block diagram of a multi-layered speech recognition apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a schematic block diagram of a multi-layered speech recognition apparatus according to an embodiment of the present invention. The multi-layered speech recognition apparatus of FIG. 1 includes a client 10 and N servers 20, 22, ..., and 24 (where N is a positive integer equal to or greater than 1).

Figure 2:
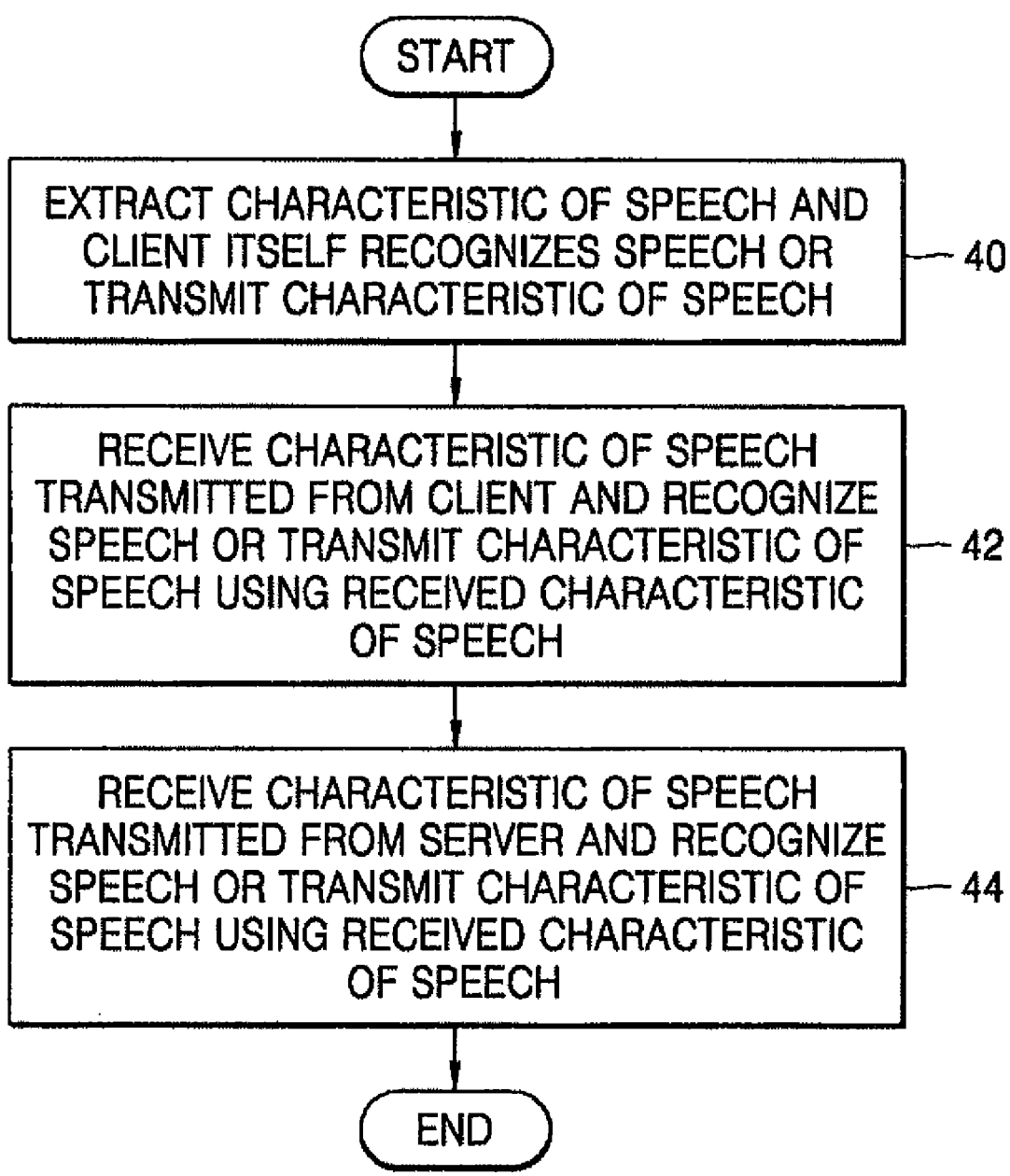
FIG. 2 is a flowchart illustrating a multi-layered speech recognition method performed in the multi-layered speech recognition apparatus shown in FIG. 1.

FIG. 2 is a flowchart illustrating a multi-layered speech recognition method performed in the multi-layered speech recognition apparatus shown in FIG. 1. The multi-layered speech recognition method of FIG. 2 includes the client 10 recognizing speech or transmitting a characteristic of the speech (operation 40) and at least one server recognizing the speech that is not recognized by the client 10 itself (operations 42 and 44).

In operation 40, the client 10 shown in FIG. 1 inputs the speech to be recognized through an input terminal IN1, extracts a characteristic of the input speech, checks whether the client 10 itself can recognize the speech using the extracted characteristic of the speech, and recognizes the speech or transmits the characteristic of the speech to one of the servers 20, 22, ..., and 24 according to a checked result. Here, the client 10 has a small capacity of resources, like in a mobile phone, a remote controller, or a robot, and can perform word speech recognition and/or connected word speech recognition. The resources may be a processing speed of a central processing unit (CPU) and the size of a memory that stores data for speech recognition. The word speech recognition is to recognize one word, for example, command such as 'cleaning,' etc. which are sent to a robot, etc., and the connected word speech recognition is to recognize two or more simply-connected words required for a mobile phone etc., such as 'send message,' etc.

Hereinafter, a server of the servers 20, 22, ..., and 24 which directly receives a characteristic of the speech transmitted from the client 10, is referred to as a first server, a server which directly receives a characteristic of the speech transmitted from the first server or from a certain server is referred to a different server, and the different server is also referred to as an n-th server ($2 \leq n \leq N$).

After operation 40, in operation 42, the first server 20, 22, ..., or 24 receives a characteristic of the speech transmitted from the client 10, checks whether the first server 20, 22, ..., and 24 itself can recognize the speech using the characteristic of the received speech, and recognizes speech or transmits the characteristic of the speech to the n-th server according to a checked result.

After operation 42, in operation 44, the n-th server receives a characteristic of the speech transmitted from a (n−1)-th server, checks whether the n-th server itself can recognize the speech using the received characteristic of the speech, and recognizes speech or transmits the characteristic of the speech to a (n+1)-th server according to a checked result. For example, when the n-th server itself cannot recognize the speech, the (n+1)-th server performs operation 44, and when the (n+1)-th server itself cannot recognize the speech, a (n+2)-th server performs operation 44. In this way, several servers try to perform speech recognition until the speech is recognized by one of the servers.

In this case, when one of first through N-th servers recognizes the speech, a recognized result may be outputted via an output terminal ($OUT_1$, $OUT_2$, ..., or $OUT_N$) but may also be outputted to the client 10. This is because the client 10 can also use the result of speech recognition even though the client 10 has not recognized the speech.

According to an embodiment of the present invention, when the result of speech recognized by one of the first through N-th servers is outputted to the client 10, the client 10 may also inform a user of the client 10 via an output terminal $OUT_{N+1}$ whether the speech is recognized by the server.

Each of the servers 20, 22, ..., and 24 of FIG. 1 does not extract the characteristic of the speech but receives the characteristic of the speech extracted from the client 10 and can perform speech recognition immediately. Each of the servers 20, 22, ..., and 24 can retain more resources than the client 10, and the servers 20, 22, ..., and 24 retain different capacities of resources. In this case, the servers are connected to one another via networks 13, 15, ..., and 17 as shown in FIG. 1, regardless of having small or large resource capacity. Likewise, the servers 20, 22, ..., and 24 and the client 10 may be connected to one another via networks 12, 14, ..., and 16. For example, a home server having a small capacity of resources exists. The home server can recognize household appliances-controlling speech conversation composed of a comparatively simple natural language, such as 'please turn on a golf channel'. Another example, a service server such as ubiquitous robot companion (URC), having a large capacity of resource exists. The service server can recognize a composite command composed of a natural language in a comparatively long sentence, such as 'please let me know what movie is now showing'.

In the multi-layered speech recognition apparatus and method shown in FIGS. 1 and 2, the client 10 tries to perform speech recognition (operation 40). When the client 10 does not recognize the speech, the first server having a larger capacity of resource than the client 10 tries to perform speech recognition (operation 42). When the first server does not recognize the speech, servers having larger capacities of resources than the first server try to perform speech recognition, one after another (operation 44).

When the speech is a comparatively simple natural language, the speech can be recognized by the first server having a small resource capacity. In this case, the multi-layered speech recognition method shown in FIG. 2 may include operations 40 and 42 and may not include operation 44. However, when the speech is a natural language in a comparatively long sentence, the speech can be recognized by a different server having a large capacity of resource. In this case, the multi-layered speech recognition method shown in FIG. 2 includes operations 40, 42, and 44.

Hereinafter, the configuration and operation of the multi-layered speech recognition apparatus according to embodiments of the present invention and the multi-layered speech recognition method performed in the multi-layered speech recognition apparatus will be described with reference to the accompanying drawings.

Figure 3:
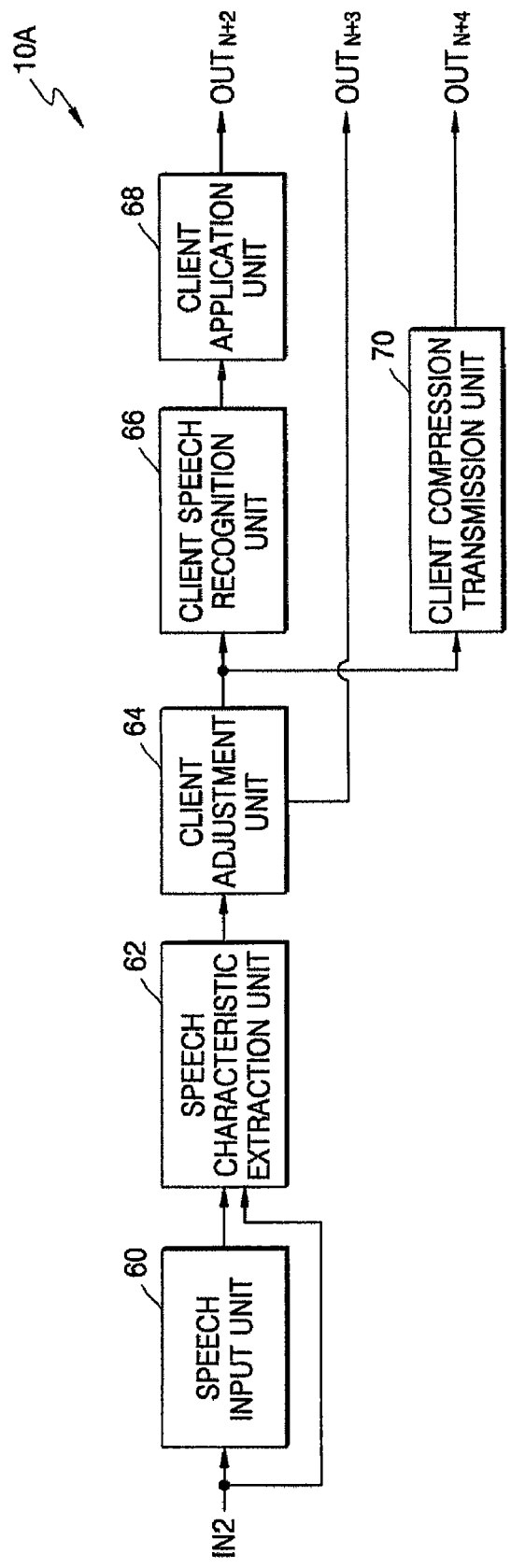
FIG. 3 is a block diagram of the client shown in FIG. 1 according to an embodiment of the present invention.

FIG. 3 is a block diagram of the client 10 shown in FIG. 1 according to an embodiment 10A of the present invention. The client 10A of FIG. 3 includes a speech input unit 60, a speech characteristic extraction unit 62, a client adjustment unit 64, a client speech recognition unit 66, a client application unit 68, and a client compression transmission unit 70.

Figure 4:
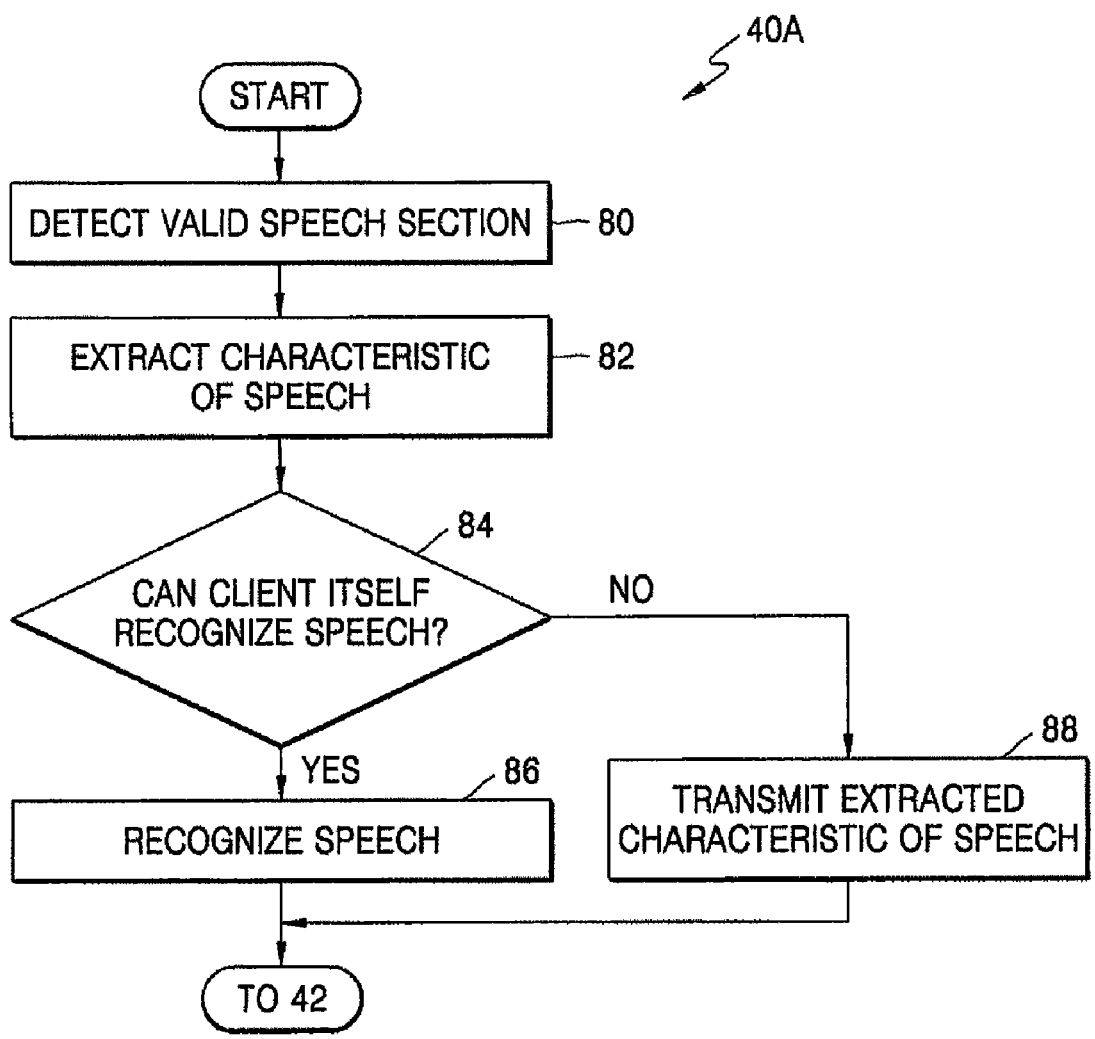
FIG. 4 a flowchart illustrating operation 40 shown in FIG. 2 according to an embodiment of the present invention.

FIG. 4 is a flowchart illustrating operation 40 shown in FIG. 2 according to an embodiment 40A of the present invention. Operation 40A of FIG. 4 includes extracting a characteristic of speech using a detected valid speech section (operations 80 and 82) and recognizing the speech or transmitting the extracted characteristic of the speech depending on whether the speech can be recognized by a client itself (operations 84 through 88).

In operation 80, the speech input unit 60 shown in FIG. 3 inputs speech through, for example, a microphone, through an input terminal IN2 from the outside, detects a valid speech section from the input speech, and outputs the detected valid speech section to the speech characteristic extraction unit 62.

After operation 80, in operation 82, the speech characteristic extraction unit 62 extracts a characteristic of the speech to be recognized from the valid speech section and outputs the extracted characteristic of the speech to the client adjustment unit 64. Here, the speech characteristic extraction unit 60 can also extract the characteristic of the speech in a vector format from the valid speech section.

According to another embodiment of the present invention, the client 10A shown in FIG. 3 may not include the speech input unit 60, and operation 40A shown in FIG. 4 may also not include operation 80. In this case, in operation 82, the speech characteristic extraction unit 62 directly inputs the speech to be recognized through the input terminal IN2, extracts the characteristic of the input speech, and outputs the extracted characteristic to the client adjustment unit 64.

After operation 82, in operations 84 and 88, the client adjustment unit 64 checks whether the client 10 itself can recognize speech using the characteristic extracted by the speech characteristic extraction unit 62 and transmits the characteristic of the speech to a first server through an output terminal $OUT_{N+3}$ or outputs the characteristic of the speech to the client speech recognition unit 66, according to a checked result.

For example, in operation 84, the client adjustment unit 64 determines whether the client 10 itself can recognize the speech, using the characteristic of the speech extracted by the speech characteristic extraction unit 62. If it is determined that the client 10 itself cannot recognize the speech, in operation 88, the client adjustment unit 64 transmits the extracted characteristic of the speech to the first server through the output terminal $OUT_{N+3}$. However, if it is determined that the client 10 itself can recognize the speech, the client adjustment unit 64 outputs the characteristic of the speech extracted by the speech characteristic extraction unit 62 to the client speech recognition unit 66.

Thus, in operation 86, the client speech recognition unit 66 recognizes the speech from the characteristic input from the client adjustment unit 64. In this case, the client speech recognition unit 66 can output a recognized result in a text format to the client application unit 68.

The client application unit 68 shown in FIG. 3 performs the same function as the client 10 using a result recognized by the client speech recognition unit 66 and outputs a result through an output terminal $OUT_{N+2}$. For example, when the client 10 is a robot, the function performed by the client application unit 68 may be a function of controlling the operation of the robot.

The client 10 shown in FIG. 3 may not include the client application unit 68. In this case, the client speech recognition unit 66 directly outputs a recognized result to the outside.

Figure 5:
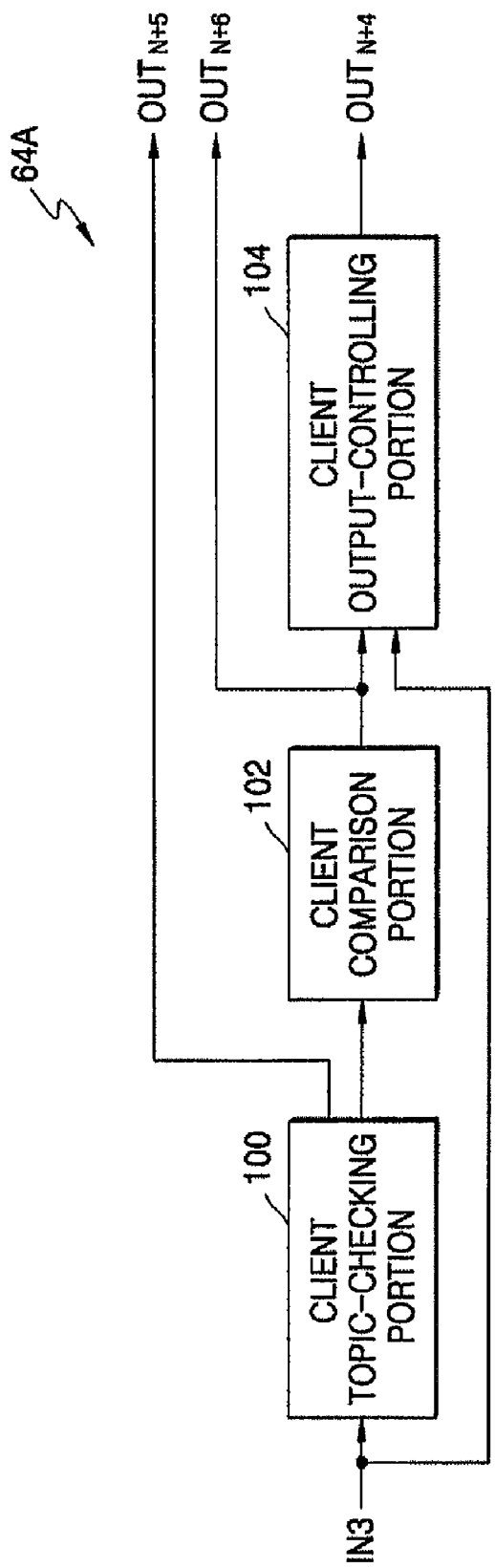
FIG. 5 is a block diagram of the client adjustment unit shown in FIG. 3 according to an embodiment of the present invention.

FIG. 5 is a block diagram of the client adjustment unit 64 shown in FIG. 3 according to an embodiment 64A of the present invention. The client adjustment unit 64A of FIG. 5 includes a client topic-checking portion 100, a client comparison portion 102, and a client output-controlling portion 104.

Figure 6:
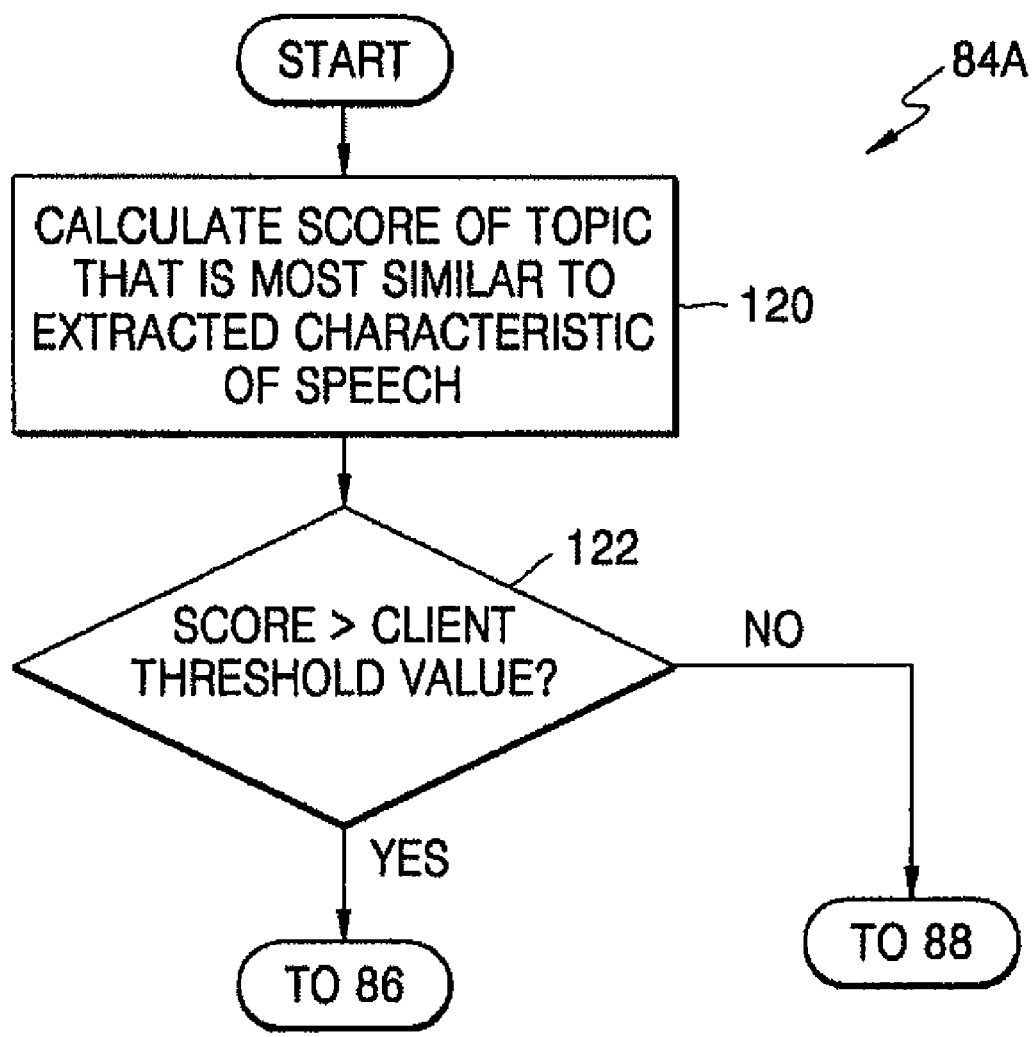
FIG. 6 is a flowchart illustrating operation 84 shown in FIG. 4 according to an embodiment of the present invention.

FIG. 6 is a flowchart illustrating operation 84 shown in FIG. 4 according to an embodiment 84A of the present invention. Operation 84A includes calculating a score of a topic, which is most similar to an extracted characteristic of speech (operation 120), and comparing the calculated score with a client threshold value (operation 122).

After operation 82, in operation 120, the client topic-checking portion 100 detects a topic, which is most similar to the characteristic of the speech extracted by the speech characteristic extraction unit 62 and input through an input terminal IN3, calculates a score of the detected most similar topic, outputs a calculated score to the client comparison portion 102, and outputs the most similar topic to the client speech recognition unit 66 through an output terminal $OUT_{N+5}$.

After operation 120, in operation 122, the client comparison portion 102 compares the detected score with the client threshold value and outputs a compared result to the client output-controlling portion 104 and to the client speech recognition unit 66 through an output terminal $OUT_{N+6}$ (operation 122). Here, the client threshold value is a predetermined value and may be determined experimentally.

For a better understanding of the present invention, assuming that the score is larger than the client threshold value when the speech can be recognized by the client itself, if the score is larger than the client threshold value, the method proceeds to operation 86 and the client speech recognition unit 66 recognizes the speech. However, if the score is not larger than the client threshold value, the method proceeds to operation 88 and transmits the extracted characteristic of the speech to the first server.

To this end, the client output-controlling portion 104 outputs the extracted characteristic of the speech input from the speech characteristic extraction unit 62 through an input terminal IN3, to the client speech recognition unit 66 through an output terminal $OUT_{N+4}$ according to a result compared by the client comparison portion 102 or transmits the characteristic of the speech to the first server through the output terminal $OUT_{N+4}$ (where $OUT_{N+4}$ corresponds to an output terminal $OUT_{N+3}$ shown in FIG. 3). More specifically, if it is recognized by the result compared by the client comparison portion 102 that the score is larger than the client threshold value, the client output-controlling portion 104 outputs the extracted characteristic of the speech input from the speech characteristic extraction unit 62 through the input terminal IN3, to the client speech recognition unit 66 through the output terminal $OUT_{N+4}$. However, if it is recognized by the result compared by the client comparison portion 102 that the score is not larger than the client threshold value, in operation 88, the client output-controlling portion 104 transmits the extracted characteristic of the speech input from the speech characteristic extraction unit 62 through the input terminal IN3 to the first server through the output terminal $OUT_{N+4}$.

Figure 7:
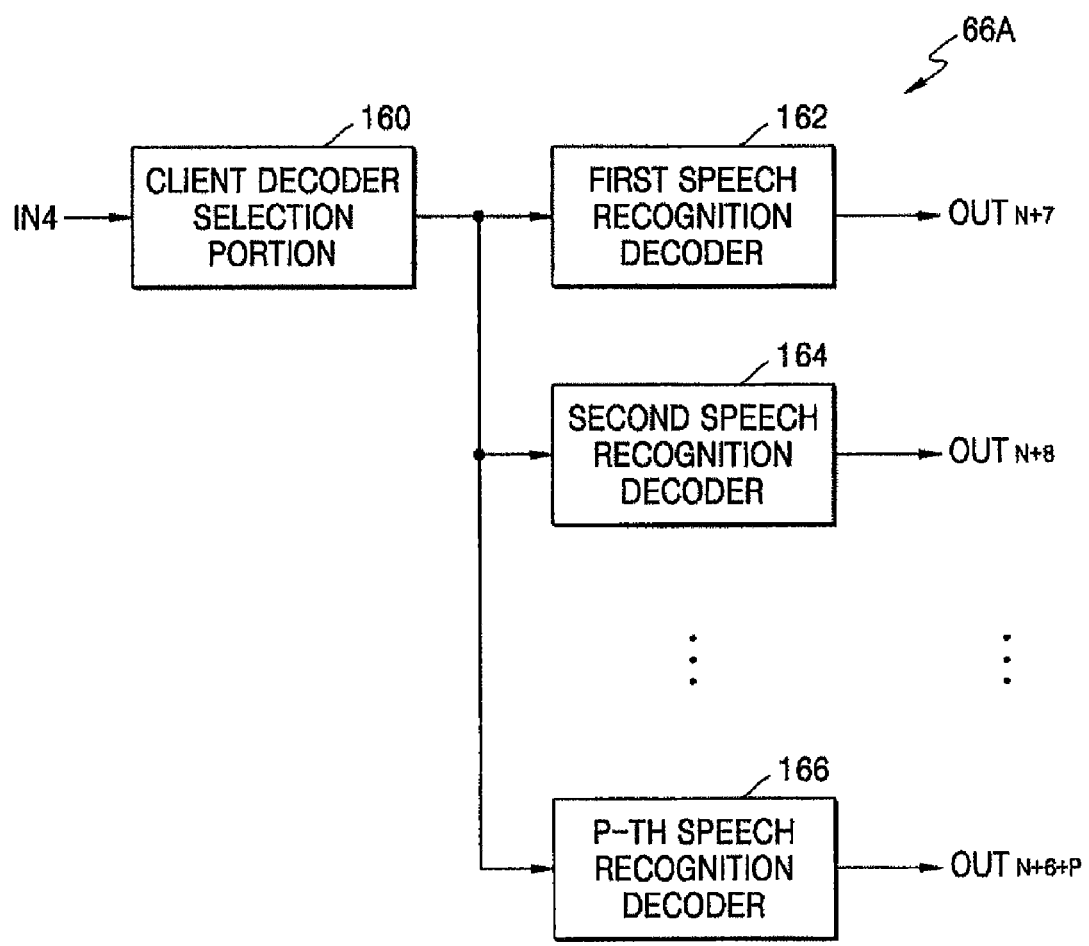
FIG. 7 is a block diagram of the client speech recognition unit shown in FIG. 3 according to an embodiment of the present invention.

FIG. 7 is a block diagram of the client speech recognition unit 66 shown in FIG. 3 according to an embodiment 66A of the present invention. The client speech recognition unit 66A of FIG. 7 includes a client decoder selection portion 160 and first through P-th speech recognition decoders 162, 164, ..., and 166. Here, P is the number of topics checked by the client topic-checking portion 100 shown in FIG. 5. That is, the client speech recognition unit 66 shown in FIG. 3 may include a speech recognition decoder according to each topic, as shown in FIG. 7.

The client decoder selection portion 160 selects a speech recognition decoder corresponding to a detected most similar topic input from the client topic-checking portion 100 through an input terminal IN4, from the first through P-th speech recognition decoders 162, 164, ..., and 166. In this case, the client decoder selection portion 160 outputs the characteristic of the speech input from the client output-controlling portion 104 through the input terminal IN4 to the selected speech recognition decoder. To perform this operation, the client decoder selection portion 160 should be activated in response to a compared result input from the client comparison portion 102. More specifically, if it is recognized by the compared result input from the client comparison portion 102 that the score is larger than the client threshold value, the client decoder selection portion 160 selects a speech recognition decoder and outputs the characteristic of the speech to the selected speech recognition decoder, as previously described.

The p-th ($1 \leq p \leq P$) speech recognition decoder shown in FIG. 7 recognizes speech from the characteristic output from the client decoder selection portion 160 and outputs a recognized result through an output terminal $OUT_{N+6+p}$.

Figure 8:
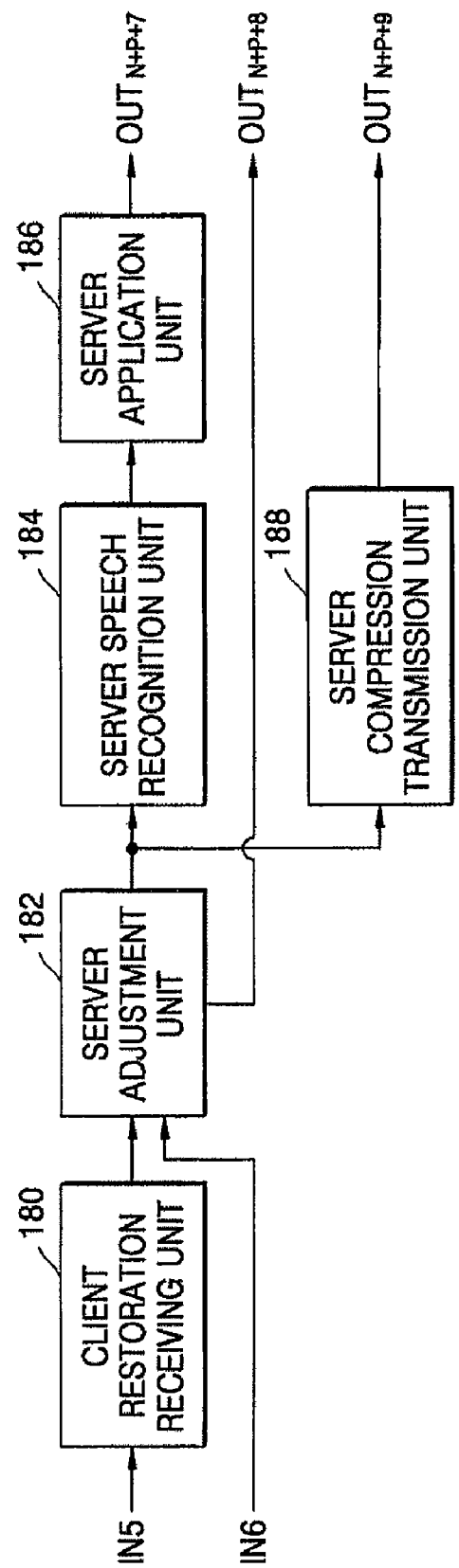
FIG. 8 is a block diagram of a q-th server according to an embodiment of the present invention.

FIG. 8 is a block diagram of a q-th server according to an embodiment of the present invention. The first server of FIG. 8 includes a client restoration receiving unit 180, a server adjustment unit 182, a server speech recognition unit 184, a server application unit 186, and a server compression transmission unit 188. Here, $1 \leq q \leq N$. For an explanatory convenience, the q-th server is assumed to be the first server. However, the present invention is not limited to this assumption.

Figure 9:
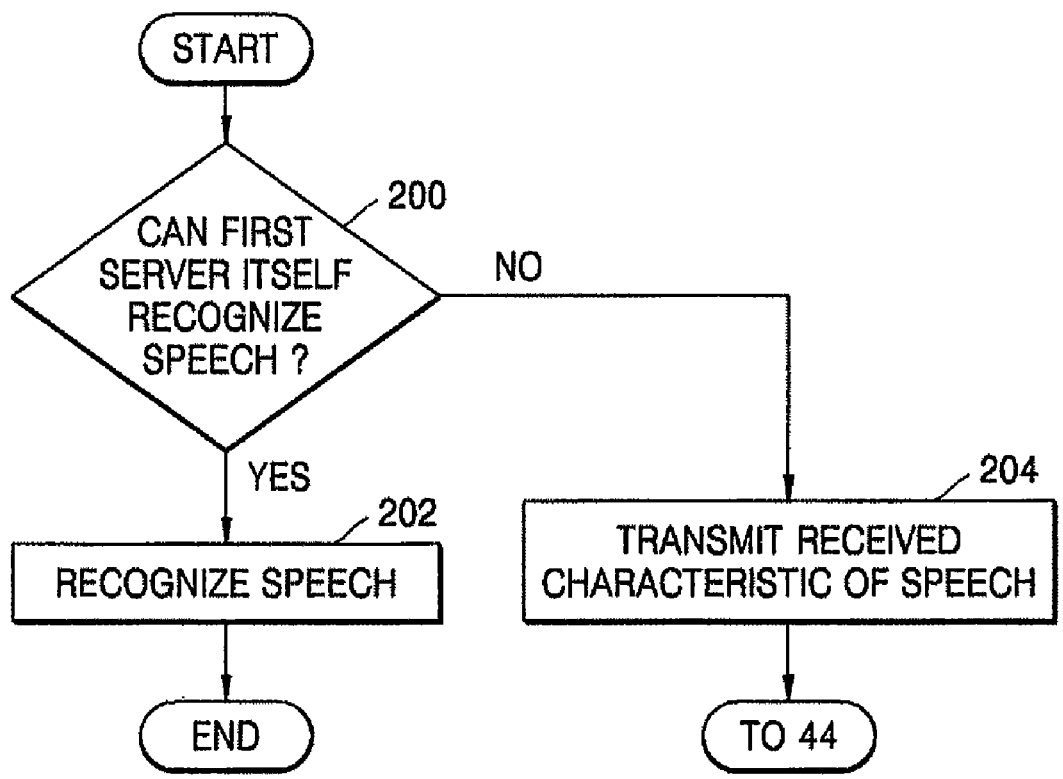
FIG. 9 is a flowchart illustrating operation 42 shown in FIG. 2 according to an embodiment of the present invention.

FIG. 9 is a flowchart illustrating operation 42 shown in FIG. 2 according to an embodiment of the present invention. Operation 42 of FIG. 9 includes recognizing speech or transmitting a received characteristic of the speech depending on whether a first server itself can recognize the speech (operations 200 through 204).

Before describing the apparatus shown in FIG. 8 and the method shown in FIG. 9, an environment of a network via which the characteristic of the speech is transmitted from the client 10 to the first server will now be described.

According to an embodiment of the present invention, the network via which the characteristic of the speech is transmitted from the client 10 to the first server may be a loss channel or a lossless channel. Here, the loss channel is a channel via which a loss occurs when data or a signal is transmitted and may be a wire/wireless speech channel, for example. In addition, a lossless channel is a channel via which a loss does not occur when data or a signal is transmitted and may be a wireless LAN data channel such as a transmission control protocol (TCP). In this case, since a loss occurs when the characteristic of the speech is transmitted to the loss channel, in order to transmit the characteristic of the speech to the loss channel, a characteristic to be transmitted from the client 10 is compressed, and the first server should restore the compressed characteristic of the speech.

For example, as shown in FIG. 3, the client 10A may further include the client compression transmission unit 70. Here, the client compression transmission unit 70 compresses the characteristic of the speech according to a result obtained by the client comparison portion 102 of the client adjustment unit 64A and in response to a transmission format signal and transmits the compressed characteristic of the speech to the first server through an output terminal $OUT_{N+4}$ via the loss channel. Here, the transmission format signal is a signal generated by the client adjustment unit 64 when a network via which the characteristic of the speech is transmitted is a loss channel. More specifically, if it is recognized by the result compared by the client comparison portion 102 that the score is not larger than the client threshold value, the client compression transmission unit 70 compresses the characteristic of the speech and transmits the compressed characteristic of the speech in response to the transmission format signal input from the client adjustment unit 64.

Figure 10:
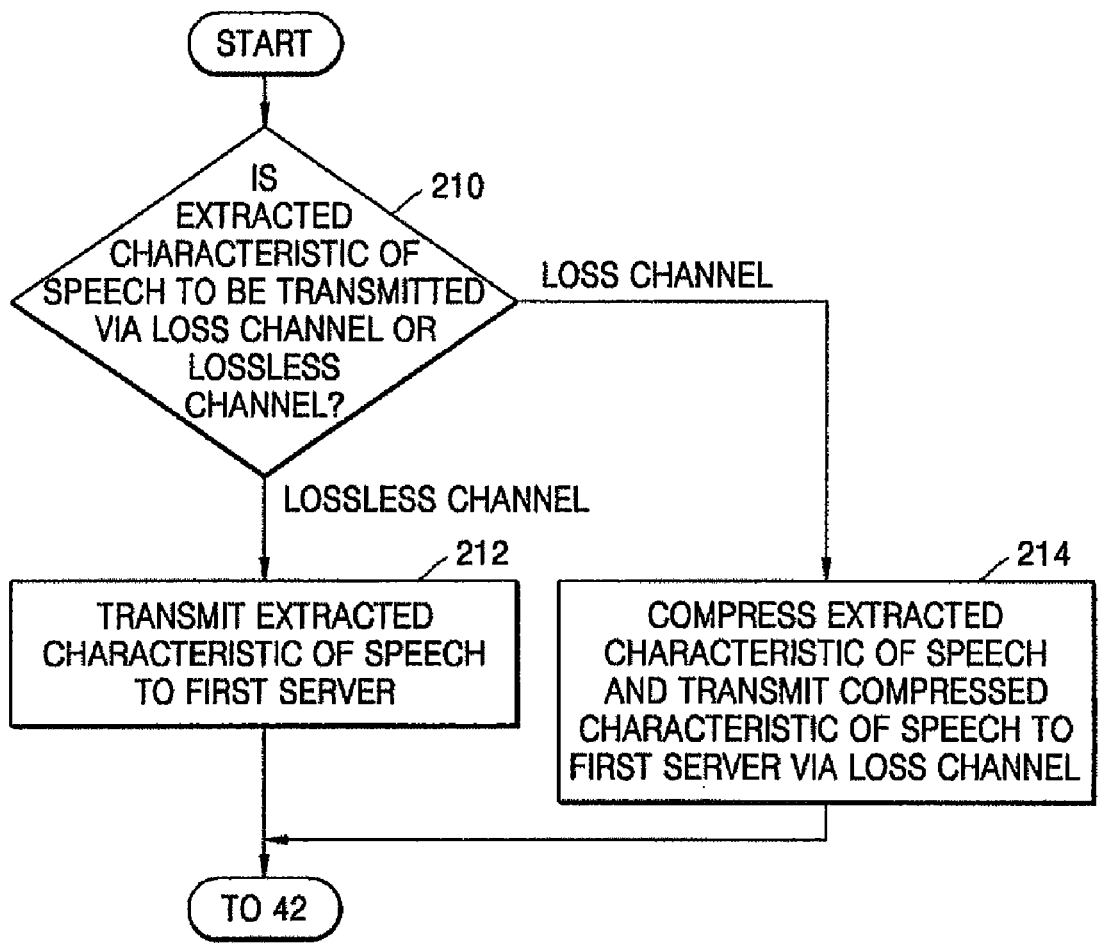
FIG. 10 is a flowchart illustrating operation 88 shown in FIG. 4 according to an embodiment of the present invention.

FIG. 10 is a flowchart illustrating operation 88 shown in FIG. 4 according to an embodiment of the present invention. Operation 88 of FIG. 10 includes compressing and transmitting a characteristic of speech depending on whether the characteristic of the speech is to be transmitted via a loss channel or a lossless channel (operations 210 through 214).

In operation 210, the client adjustment unit 64 determines whether the characteristic extracted by the speech characteristic extraction unit 62 is to be transmitted via the loss channel or the lossless channel. That is, the client adjustment unit 64 determines whether the network via which the characteristic of the speech is transmitted is a loss channel or a lossless channel.

If it is determined that the extracted characteristic of the speech is to be transmitted via the lossless channel, in operation 212, the client adjustment unit 64 transmits the characteristic of the speech extracted by the speech characteristic extraction unit 62 to the first server through an output terminal $OUT_{N+3}$ via the lossless channel.

However, if it is determined that the extracted characteristic of the speech is to be transmitted via the loss channel, the client adjustment unit 64 generates a transmission format signal and outputs the transmission format signal to the client compression transmission unit 70. In this case, in operation 214, the client compression transmission unit 70 compresses the characteristic of the speech extracted by the speech characteristic extraction unit 62 and input from the client adjustment unit 64 and transmits the compressed characteristic of the speech to the first server through an output terminal $OUT_{N+4}$ via the loss channel.

The client restoration receiving portion 180 shown in FIG. 8 receives the compressed characteristic of the speech transmitted from the client compression transmission unit 70 shown in FIG. 3 through an input terminal IN5, restores the received compressed characteristic of the speech, and outputs the restored characteristic of the speech to the server adjustment portion 182. In this case, the first server shown in FIG. 8 performs operation 42 shown in FIG. 2 using the restored characteristic of the speech.

According to another embodiment of the present invention, the client 10A shown in FIG. 3 may not include the client compression transmission unit 70. In this case, the first server shown in FIG. 8 may not include the client restoration receiving portion 180, the server adjustment portion 182 directly receives the characteristic of the speech transmitted from the client 10 through an input terminal IN6, and the first server shown in FIG. 8 performs operation 42 shown in FIG. 2 using the received characteristic of the speech.

Hereinafter, for a better understanding of the present invention, assuming that the first server shown in FIG. 8 does not include the client restoration receiving portion 180, the operation of the first server shown in FIG. 8 will be described. However, the present invention is not limited to this.

The server adjustment portion 182 receives the characteristic of the speech transmitted from the client 10 through the input terminal IN6, checks whether the first server itself can recognize the speech, using the received characteristic of the speech, and transmits the received characteristic of the speech to a different server or outputs the received characteristic of the speech to the server speech recognition unit 184, according to a checked result (operations 200 through 204).

In operation 200, the server adjustment unit 182 determines whether the first server itself can recognize the speech, using the received characteristic of the speech. If it is determined by the server adjustment unit 182 that the first server itself can recognize the speech, in operation 202, the server speech recognition unit 184 recognizes the speech using the received characteristic of the speech input from the server adjustment unit 182 and outputs a recognized result. In this case, the server speech recognition unit 184 can output the recognized result in a textual format.

The server application unit 186 performs as the first server using the recognized result and outputs a performed result through an output terminal $OUT_{N+P+7}$. For example, when the first server is a home server, a function performed by the server application unit 186 may be a function of controlling household appliances or searching information.

However, if it is determined by the server adjustment unit 182 that the first server itself cannot recognize the speech, in operation 204, the server adjustment unit 182 transmits the received characteristic of the speech to a different server through an output terminal $OUT_{N+P+8}$.

Figure 11:
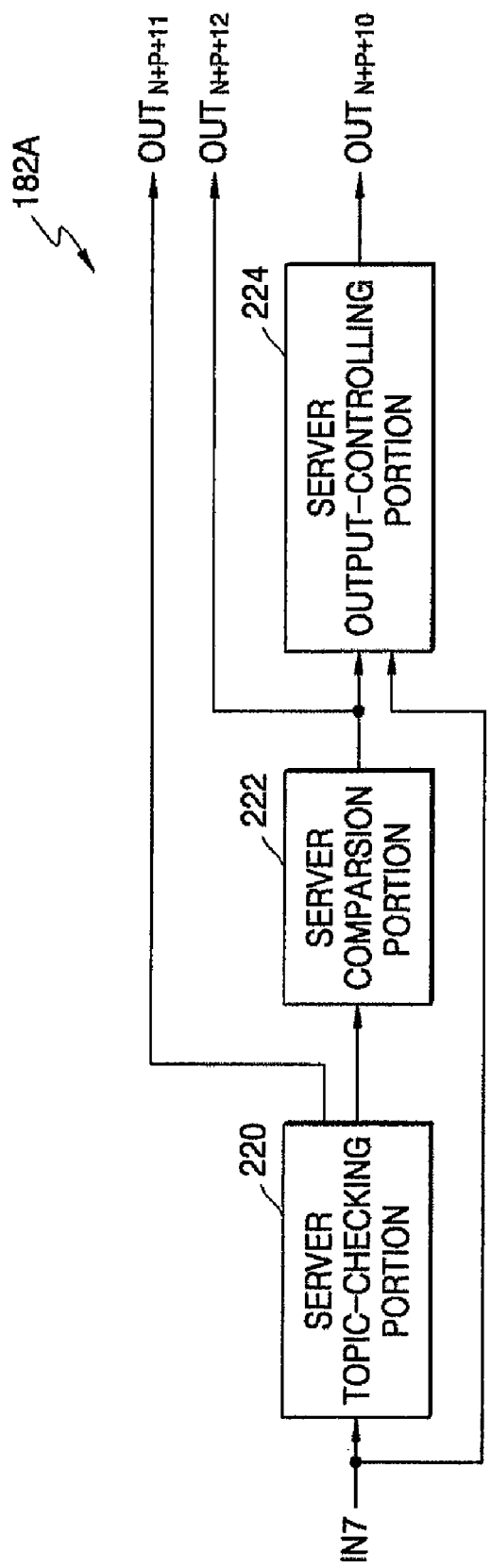
FIG. 11 is a block diagram of the server adjustment unit shown in FIG. 8 according to an embodiment of the present invention

FIG. 11 is a block diagram of the server adjustment unit 182 shown in FIG. 8 according to an embodiment 182A of the present invention. The server adjustment unit 182A includes a server topic-checking portion 220, a server comparison portion 222, and a server output-controlling portion 224.

Figure 12:
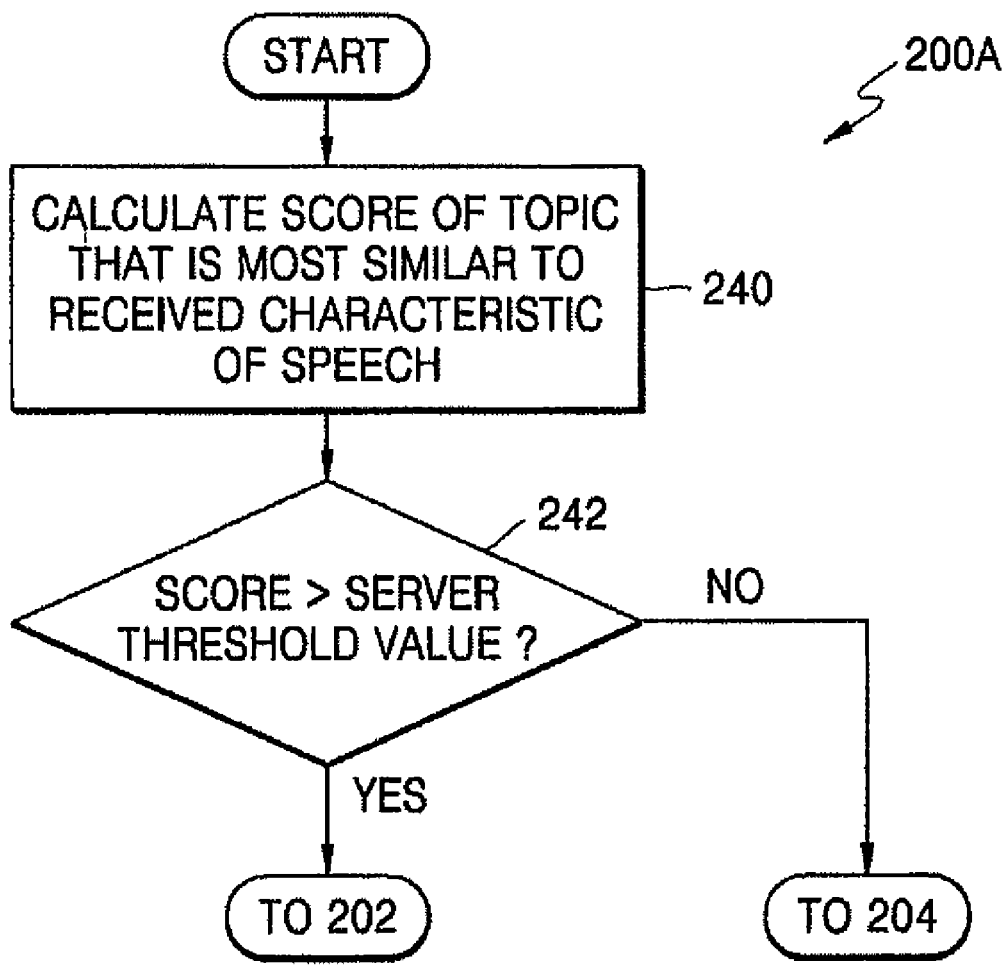
FIG. 12 is a flowchart illustrating operation 200 shown in FIG. 9 according to an embodiment of the present invention.

FIG. 12 is a flowchart illustrating operation 200 shown in FIG. 9 according to an embodiment 200A of the present invention. Operation 200A of FIG. 9 includes calculating a score of a topic that is most similar to a received characteristic of speech (operation 240) and comparing the score with a server threshold value (operation 242).

In operation 240, the server topic-checking portion 220 detects the topic that is most similar to the characteristic of the speech, which is transmitted from the client 10 and received through an input terminal IN7, calculates a score of the detected most similar topic, outputs the calculated score to the server comparison portion 222, and outputs the most similar topic to the server speech recognition unit 184 through an output terminal $OUT_{N+P+11}$.

After operation 240, in operation 242, the server comparison portion 222 compares the score detected by the server topic-checking portion 220 with the server threshold value and outputs a compared result to the server output-controlling portion 224 and to the server speech recognition unit 184 through an output terminal $OUT_{N+P+12}$. Here, the server threshold value is a predetermined value and may be determined experimentally.

For a better understanding of the present invention, if the score is larger than the server threshold value, in operation 202, the server speech recognition unit 184 recognizes the speech. However, if the score is not larger than the server threshold value, in operation 204, the server adjustment unit 182 transmits the received characteristic of the speech to a different server.

To this end, the server output-controlling portion 224 outputs the characteristic of the speech received through an input terminal IN7 to the server speech recognition unit 184 through an output terminal $OUT_{N+P+10}$ or transmits the received characteristic of the speech to a different server through the output terminal $OUT_{N+P+10}$ (where $OUT_{N+P+10}$ corresponds to an output terminal $OUT_{N+P+8}$ shown in FIG. 8) in response to a result compared by the server comparison portion 222. More specifically, if it is recognized by the result compared by the server comparison portion 222 that the score is larger than the server threshold value, the server output-controlling portion 224 outputs the characteristic of the speech received through the input terminal IN7 to the server speech recognition unit 184 through the output terminal $OUT_{N+P+10}$. However, if it is recognized by the result compared by the server comparison portion 222 that the score is not larger than the server threshold value, in operation 204, the server output-controlling portion 224 transmits the characteristic of the speech received through the input terminal IN7 to a different server through the output terminal $OUT_{N+P+10}$.

Figure 13:
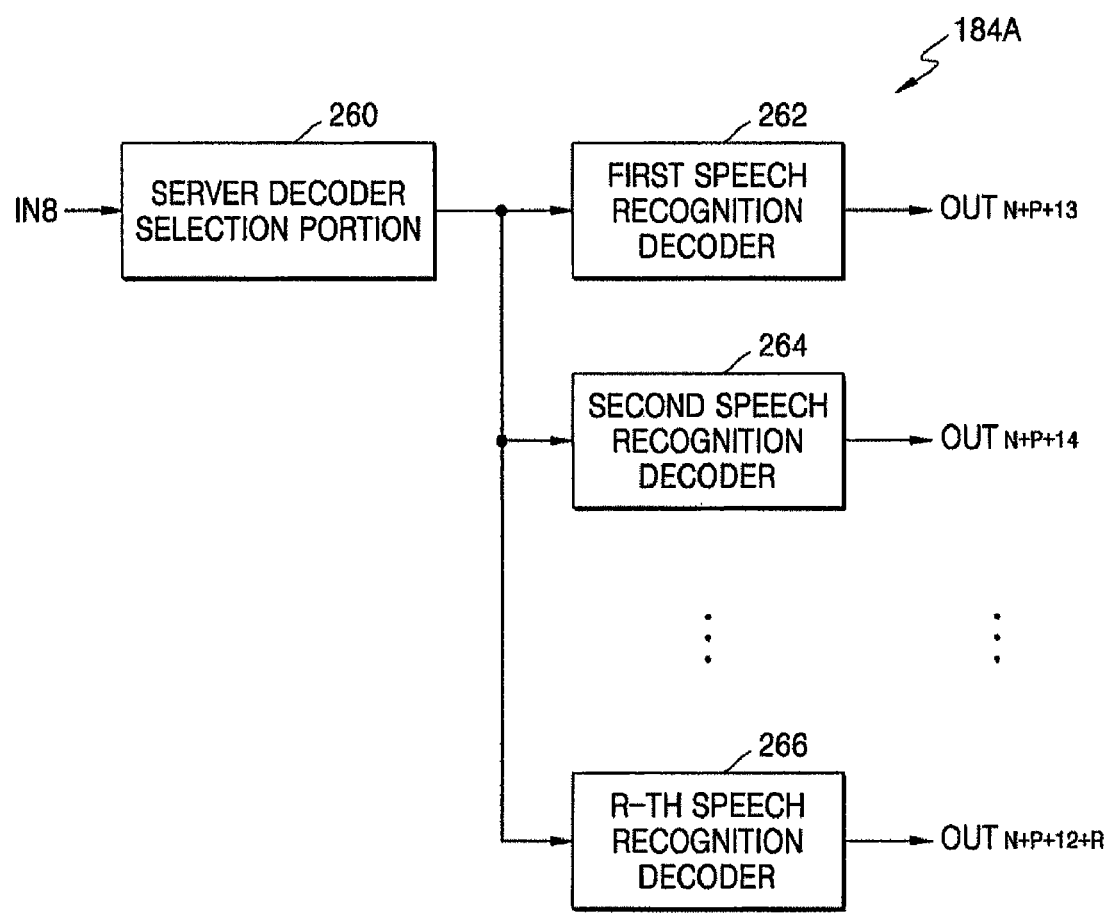
FIG. 13 is a block diagram of the server speech recognition unit shown in FIG. 8 according to an embodiment of the present invention.

FIG. 13 is a block diagram of the server speech recognition unit 184 shown in FIG. 8 according to an embodiment 184A of the present invention. The server speech recognition unit 184A of FIG. 13 includes a server decoder selection portion 260 and first through R-th speech recognition decoders 262, 264, . . . , and 266. Here, R is the number of topics checked by the server topic-checking portion 220 shown in FIG. 11. That is, the server speech recognition unit 184 shown in FIG. 8 may include a speech recognition decoder according to each topic, as shown in FIG. 13.

The server decoder selection portion 260 selects a speech recognition decoder corresponding to a detected most similar topic input from the server topic-checking portion 220 through an input terminal IN8, from the first through R-th speech recognition decoders 262, 264, . . . , and 266. In this case, the server decoder selection portion 260 outputs the characteristic of the speech input from the server output-controlling portion 224 through the input terminal IN8 to the selected speech recognition decoder. To perform this operation, the client decoder selection portion 260 should be activated in response to a compared result input from the server comparison portion 222. More specifically, if it is recognized by the compared result input from the server comparison portion 222 that the score is larger than the server threshold value, the server decoder selection portion 260 selects a speech recognition decoder and outputs the characteristic of the speech to the selected speech recognition decoder, as previously described.

The r-th ($1 \leq r \leq R$) speech recognition decoder shown in FIG. 13 recognizes speech from the received characteristic input from the server decoder selection portion 260 and outputs a recognized result through an output terminal $OUT_{N+P+1+12}$.

Figure 14:
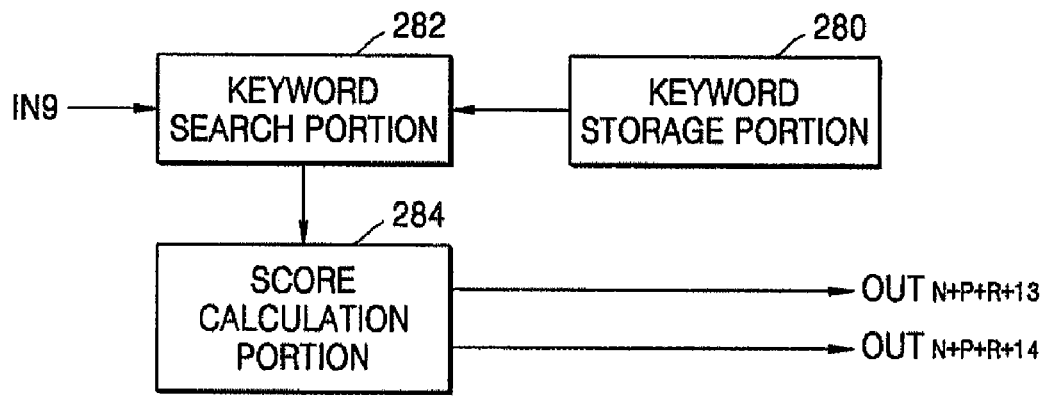
FIG. 14 is a block diagram of the client topic-checking portion shown in FIG. 5 or the server topic-checking portion shown in FIG. 11 according to an embodiment of the present invention.

FIG. 14 is a block diagram of the client topic-checking portion 100 shown in FIG. 5 or the server topic-checking portion 220 shown in FIG. 11 according to an embodiment of the present invention. The client topic-checking portion 100 or the server topic-checking portion 220 of FIG. 14 includes a keyword storage portion 280, a keyword search portion 282, and a score calculation portion 284.

Figure 15:
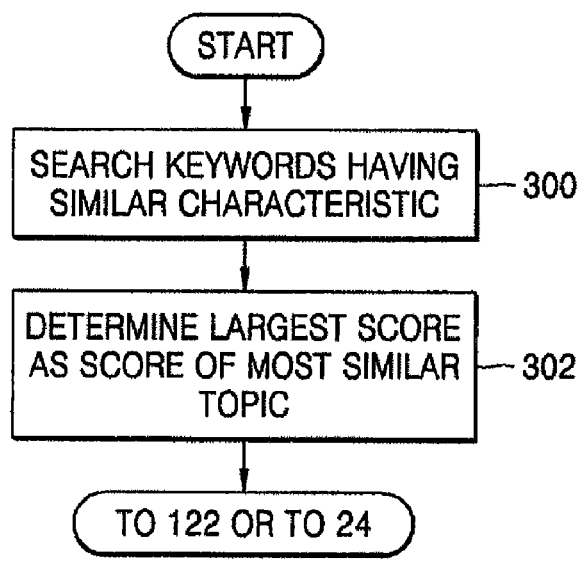
FIG. 15 is a flowchart illustrating operation 120 shown in FIG. 6 or operation 240 shown in FIG. 12 according to an embodiment of the present invention.

FIG. 15 is a flowchart illustrating operation 120 shown in FIG. 6 or operation 240 shown in FIG. 12 according to an embodiment of the present invention. Operation 120 or 240 includes searching keywords (operation 300) and determining a score of a most similar topic (operation 302).

In operation 300, the keyword search portion 282 searches keywords having a characteristic of speech similar to a characteristic of speech input through an input terminal IN9, from a plurality of keywords that have been previously stored in the keyword storage portion 280, and outputs the searched keywords in a list format to the score calculation portion 284. To this end, the keyword storage portion 280 stores a plurality of keywords. Each of the keywords stored in the keyword storage portion 280 has its own speech characteristic and scores according to each topic. That is, an i-th keyword Keyword$_i$ stored in the keyword storage portion 280 has a format such as [a speech characteristic of Keyword$_i$, Topic$_{1i}$, Score$_{1i}$, Topic$_{2i}$, Score$_{2i}$, ... ]. Here, Topic$_{ki}$ is a k-th topic for Keyword, and Score$_{ki}$ is a score of Topic$_{ki}$.

After operation 300, in operation 302, the score calculation portion 284 calculates scores according to each topic from the searched keywords having the list format input from the keyword search portion 282, selects a largest score from the calculated scores according to each topic, outputs the selected largest score as a score of a most similar topic through an output terminal OUT$_{N+P+R+13}$, and outputs a topic having the selected largest score as a most similar topic through an output terminal OUT$_{N+P+R+14}$. For example, the score calculation portion 284 can calculate scores according to each topic using Equation 1:

$$\text{Score}(\text{Topic}_k) = \prod_{j=1}^{\#} (\text{Keyword}_j \mid \text{Topic}_k), \quad (1)$$

where Score(Topic$_k$) is a score for a k-th topic Topic$_k$ and # is a total number of searched keywords having the list format input from the keyword search portion 282. Consequently, as shown in Equation 1 Score(Topic$_k$), means a result of multiplication of scores, that is, Scorek1 to Scorek# for Topic$_k$ among keywords from Keyword1 to Keyword#.

Figure 16:
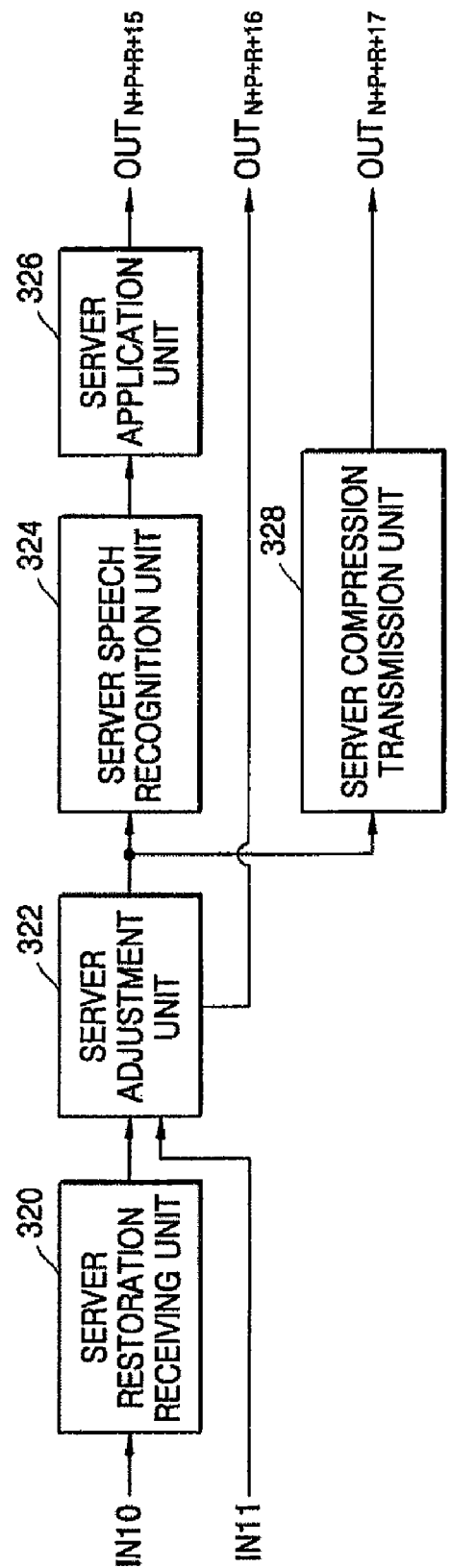
FIG. 16 is a block diagram of an n-th server according to an embodiment of the present invention.

FIG. 16 is a block diagram of an nth server according to an embodiment of the present invention. The n-th server includes a server restoration receiving unit 320, a server adjustment unit 322, a server speech recognition unit 324, a server application unit 326, and a server compression transmission unit 328. As described above, the n-th server may be a server that receives a characteristic of speech transmitted from a first server or a server that receives a characteristic of speech transmitted from a certain server excluding the first server and recognizes the speech.

Before describing the apparatus shown in FIG. 16, an environment of a network via which a characteristic of speech is transmitted will now be described.

The flowchart shown in FIG. 9 may also be a flowchart illustrating operation 44 shown in FIG. 2 according to an embodiment of the present invention. In this case, in operation 200 shown in FIG. 9, it is determined whether the n-th server itself instead of the first server itself can recognize the speech.

According to an embodiment of the present invention, the network via which the characteristic of the speech is transmitted from one server to a different server, for example, from the first server to the n-th server or from the n-th server to a (n+1)-th server may be a loss channel or a lossless channel. In this case, since a loss occurs when the characteristic of the speech is transmitted to the loss channel, in order to transmit the characteristic of the speech to the loss channel, a characteristic to be transmitted from the first server (or the n-th server) is compressed, and the n-th server (or the (n+1)-th server) should restore the compressed characteristic of the speech.

Hereinafter, for a better understanding of the present invention, assuming that the characteristic of the speech is transmitted from the first server to the n-th server, FIG. 16 will be described. However, the following description may be applied to a case where the characteristic of the speech is transmitted from the n-th server to the (n+1)-th server.

As shown in FIG. 8, the first server may further include the server compression transmission unit 188. Here, the server compression transmission unit 188 compresses the characteristic of the speech according to a result compared by the server comparison portion 222 of the server adjustment unit 182A and in response to a transmission format signal and transmits the compressed characteristic of the speech to the n-th server through an output terminal OUT$_{N+P+9}$ via the loss channel. Here, the transmission format signal is a signal generated by the server adjustment unit 182 when a network via which the characteristic of the speech is transmitted is a loss channel. More specifically, if it is recognized by the result compared by the server comparison portion 222 that the score is not larger than the server threshold value, the server compression transmission unit 188 compresses the characteristic of the speech and transmits the compressed characteristic of the speech in response to the transmission format signal input from the server adjustment unit 182.

Figure 17:
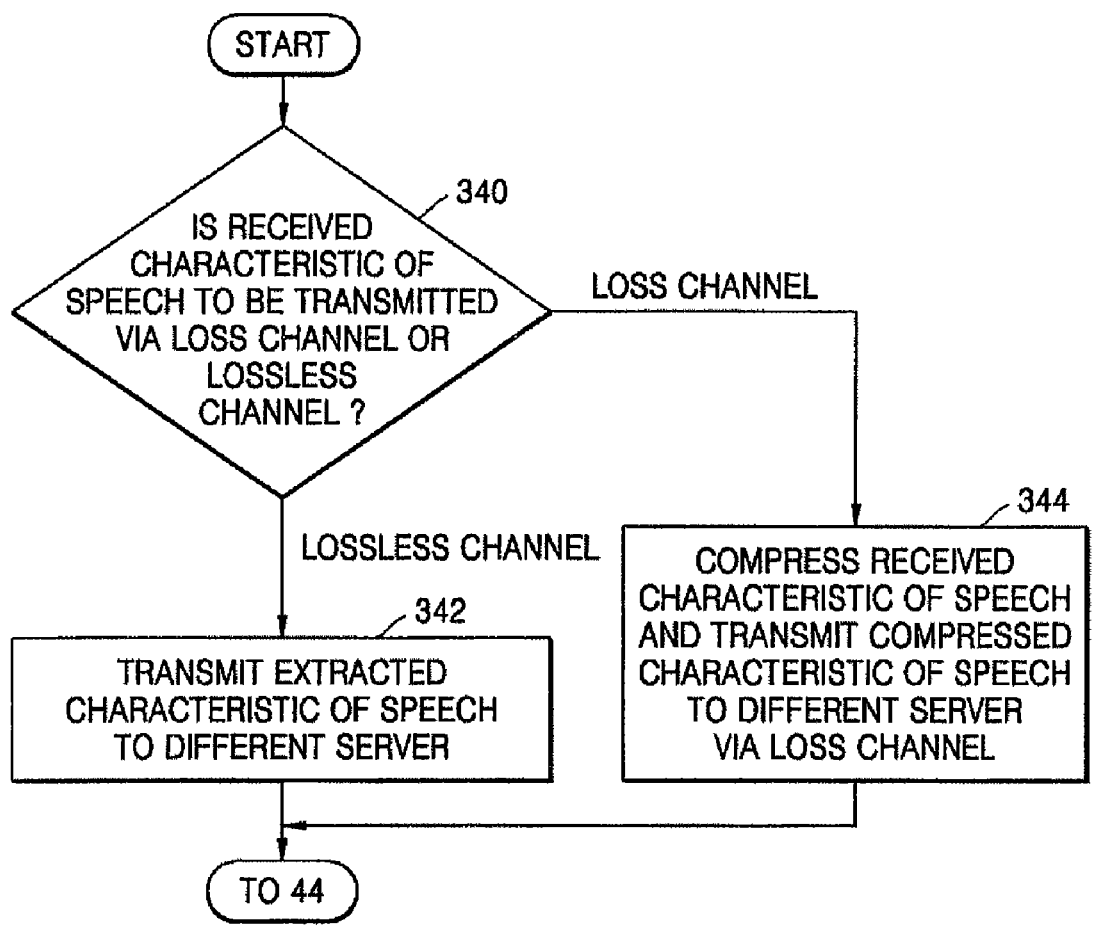
FIG. 17 is a flowchart illustrating operation 204 according to an embodiment of the present invention when the flowchart shown in FIG. 9 illustrates an embodiment of operation 44 shown in FIG. 2.

FIG. 17 is a flowchart illustrating operation 204 according to an embodiment of the present invention when the flowchart shown in FIG. 9 illustrates an embodiment of operation 44 shown in FIG. 2. Operation 204 of FIG. 17 includes compressing and transmitting a characteristic of speech depending on whether the characteristic of the speech is to be transmitted via a loss channel or a lossless channel (operations 340 through 344).

In operation 340, the server adjustment unit 182 determines whether a characteristic of speech is transmitted via the loss channel or the lossless channel. If it is determined that the received characteristic of the speech is to be transmitted via the lossless channel, in operation 342, the server adjustment unit 182 transmits the received characteristic of the speech to the n-th server through an output terminal OUT$_{N+P+8}$ via the lossless channel.

However, if it is determined that the received characteristic of the speech is to be transmitted via the loss channel, the server adjustment unit 182 generates a transmission format signal and outputs the transmission format signal to the server compression transmission unit 188. In this case, in operation 344, the server compression transmission unit 188 compresses the characteristic of the speech input from the server adjustment unit 182 when the transmission format signal is input from the server adjustment unit 182 and transmits the compressed characteristic of the speech to the n-th server through an output terminal OUT$_{N+P+9}$ via the loss channel.

Thus, the server restoration receiving unit 320 shown in FIG. 16 receives the characteristic of the speech transmitted from the compression transmission unit 188 shown in FIG. 8 through an input terminal IN10, restores the received compressed characteristic of the speech, and outputs the restored characteristic of the speech to the server adjustment unit 322.

In this case, the n-th server performs operation 44 shown in FIG. 2 using the restored characteristic of the speech.

According to another embodiment of the present invention, the first server shown in FIG. 8 may not include the server compression transmission unit 188. In this case, the n-th server shown in FIG. 16 may not include the server restoration receiving unit 320. The server adjustment unit 322 directly receives the characteristic of the speech transmitted from the first server through an input terminal IN11, and the n-th server performs operation 44 shown in FIG. 2 using the received characteristic of the speech.

The server adjustment unit 322, the server speech recognition unit 324, the server application unit 326, and the server compression transmission unit 328 of FIG. 16 perform the same functions as those of the server adjustment unit 182, the server speech recognition unit 184, the server application unit 186, and the server compression transmission unit 188 of FIG. 8, and thus, a detailed description thereof will be omitted. Thus, the output terminals $OUT_{N+P+R+15}$, $OUT_{N+P+R+16}$, and $OUT_{N+P+R+17}$ shown in FIG. 16 correspond to the output terminals $OUT_{N+P+R+7}$, $OUT_{N+P+R+8}$, and $OUT_{N+P+R+9}$, respectively, shown in FIG. 8.

As described above, in the multi-layered speech recognition apparatus and method according to the present invention, since speech recognition is to be performed in a multi-layered manner using a client and at least one server, which are connected to each other in a multi-layered manner via a network, a user of a client can recognize speech with high quality. For example, the client can recognize speech continuously, and the load on speech recognition between a client and at least one server is optimally dispersed such that the speed of speech recognition can be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A speech recognition apparatus comprising:
a client capable of interacting with a server connected to the client via a network, wherein the client recognizes the speech continuously and sequentially in a multi-layered manner, optimally distributing a work load of the speech recognition in the client and in the server and improving the speech recognition,
wherein the client extracts characteristics of speech to be recognized, checks whether the client recognizes the speech using the extracted characteristic of the speech and recognizes the speech when the client can recognize the speech and transmits the the characteristic of the speech to the server when the client cannot recognize the speech, according to the checked result.

2. A speech recognition apparatus comprising:
a plurality of servers capable of interacting with a client connected to the servers via a network, wherein the servers comprise a first server, and a second server and are configured to recognize speech that is transmitted from the client continuously and sequentially in a multi-layered manner, optimally distributing a work load of the speech recognition in the client and in the servers,
wherein the first server checks whether the first server recognizes the speech transmitted from the client using a received characteristic of the speech, and recognizes the speech when the first server can recognize the speech and transmits the characteristic of the speech to the second server when the first server cannot recognize the speech according to the checked result, and
wherein the second server has a larger capacity of resource than the first server.

* * * * *

UNITED STATES PATENT AND TRADEMARK OFFICE
CERTIFICATE OF CORRECTION

PATENT NO.      : 8,380,517 B2
APPLICATION NO. : 13/478656
DATED           : February 19, 2013
INVENTOR(S)     : Jaewon Lee et al.

Page 1 of 1

It is certified that error appears in the above-identified patent and that said Letters Patent is hereby corrected as shown below:

In the Claims

Line 8, Column 14, In Claim 1, before "speech" delete "the".

Line 10, Column 14, In Claim 1, before "speech" delete "the".

Line 16, Column 14, In Claim 1, delete "the the" and insert -- the --, therefor.

Line 22, Column 14, In Claim 2, delete "server," and insert -- server --, therefor.

Signed and Sealed this
Fifteenth Day of October, 2013

Teresa Stanek Rea
*Deputy Director of the United States Patent and Trademark Office*